Aug. 2, 1966  G. C. CHILDS  3,263,427
ELECTRO-PNEUMATIC ACTUATOR INCLUDING A SELF-CONTAINED
CLOSED SOURCE OF RESTORATIVE PNEUMATIC PRESSURE
Filed Sept. 20, 1965  2 Sheets-Sheet 1
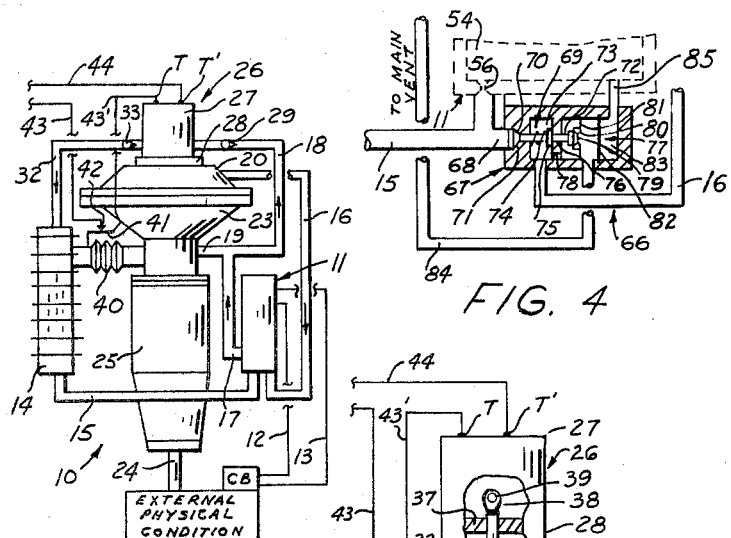
FIG. 1
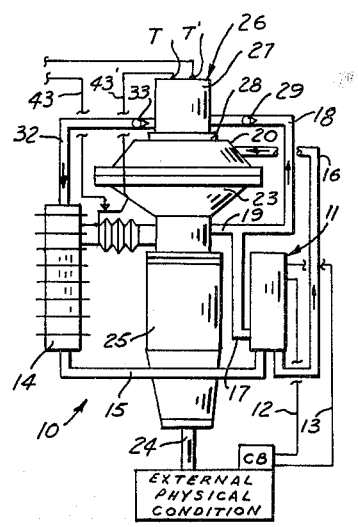
FIG. 2
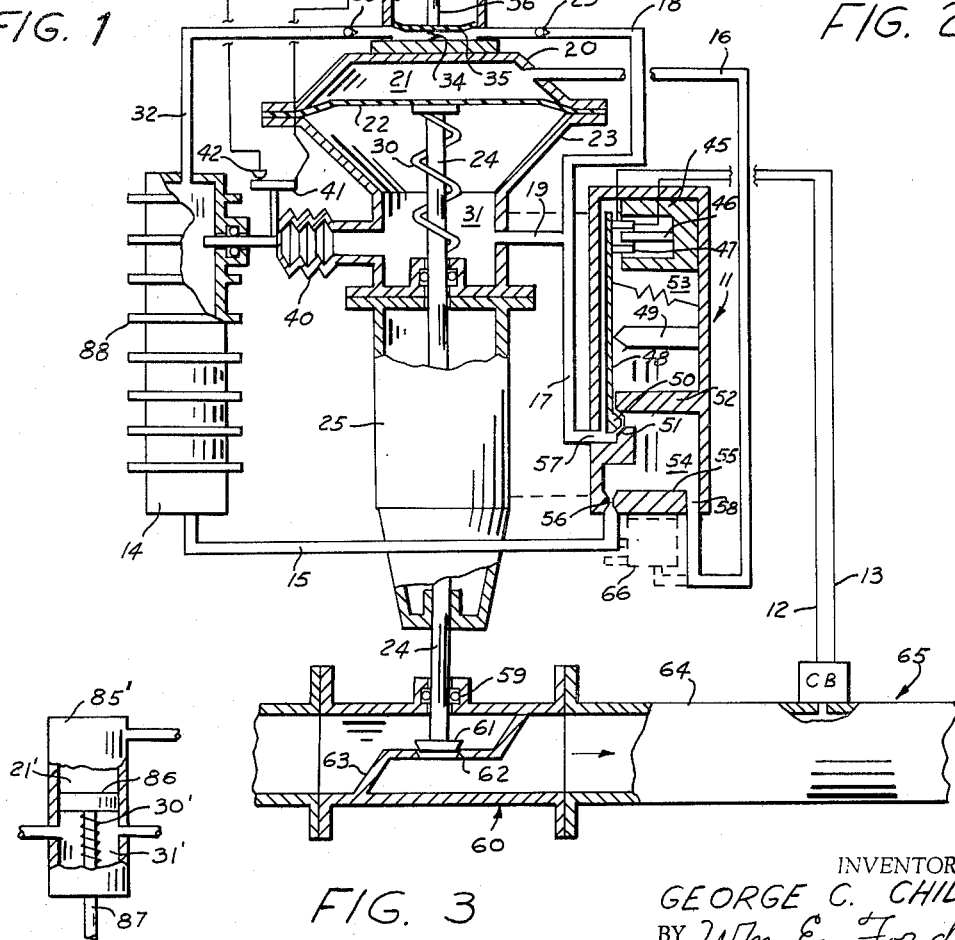
FIG. 3
FIG. 4
FIG. 5
INVENTOR.
GEORGE C. CHILDS
BY Wm. E. Ford
ATTORNEY

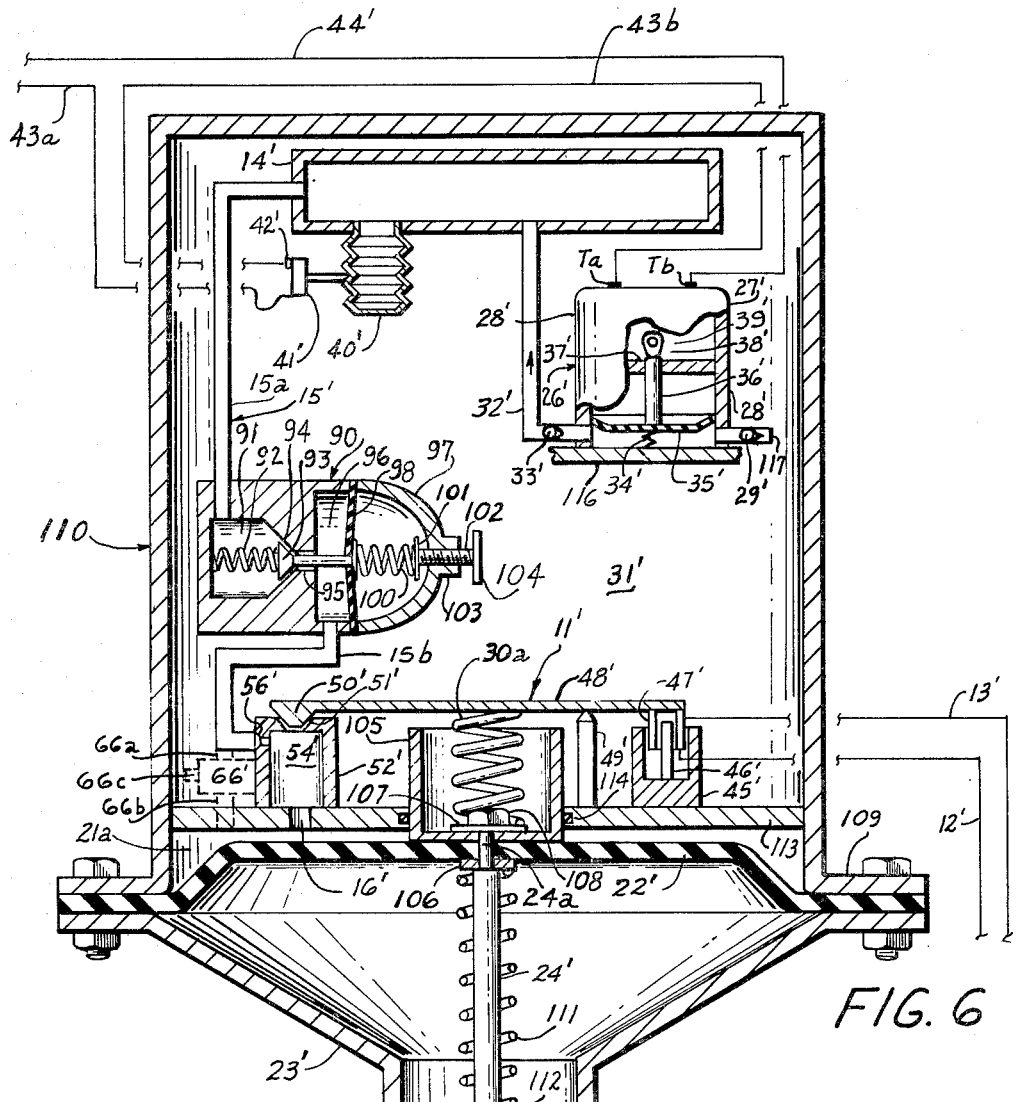
FIG. 6
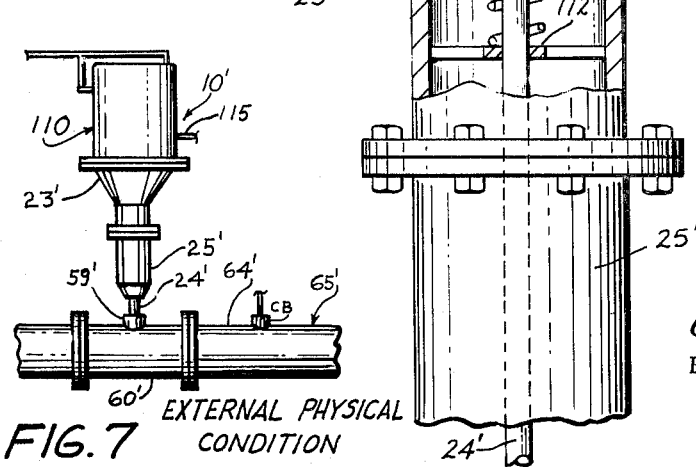
FIG. 7  EXTERNAL PHYSICAL CONDITION
INVENTOR.
GEORGE C. CHILDS
BY Wm. E. Ford
ATTORNEY United States Patent Office 3,263,427
Patented August 2, 1966

3,263,427
ELECTRO-PNEUMATIC ACTUATOR INCLUDING A SELF-CONTAINED CLOSED SOURCE OF RESTORATIVE PNEUMATIC PRESSURE
George C. Childs, 11416 Manorwood Drive, Baton Rouge, La.
Filed Sept. 20, 1965, Ser. No. 488,640
4 Claims. (Cl. 60—57)

This invention relates to an actuator which includes its own source of pneumatic pressure and which is adapted to respond with accuracy to a signal from a controller of an external physical condition in direct degree of correspondence with the impulse of the signal; this application being a continuation-in-part of co-pending application Serial No. 318,401, filed October 23, 1963, now Patent No. 3,206,934, granted September 21, 1965, for Electro-Pneumatic Actuator Including a Self-Contained Closed Source of Restorative Pneumatic Pressure, which had the background and objects as hereinunder set forth:

Heretofore actuator devices of this type have relied upon an external source of pneumatic pressure for the actuating gaseous medium, such as compressed air delivery from a compressor drawing from the atmosphere, with the consequence that accurate and effective operation has been retarded, as by the air not being clean, or being subject to atmospheric condition as excess moisture, flow stoppage due to freezing, or stoppage or interference with operation due to the presence of foreign matter carried by the gas or compressed air.

However by providing an inert, compressible medium, as nitrogen or gases of similar characteristics in a closed system the objections to the use of a gas, as compressed air, from an open system, may well be obviated and overcome.

This is especially advantageous where the reaction of the pressure controlled actuator has to be in detailed accuracy and in direct or linear proportion to the impulse or intensity of the signal transmitted. Also, an actuator including a self-contained, closed control gas system may be employed in remote locations, and in places difficult of access where a source for compressed air or other gas is not available.

Also in plants where all apparatus but valves may be electrically controlled with accuracy, the electrical parts of valve control systems may be complemented by self-contained, closed pneumatic actuators to obtain the required degree of accurate valve control.

It is therefore a primary object of this invention to provide an electro-pneumatic actuator with a self-contained, closed source of pressurized gas included thereby whereby to insure detailed accuracy of response to electrical signals transmitted thereto commanding the actuator to react accordingly to an external physical condition controlled by the signal transmitter.

It is also another and further object of this invention to provide an actuator of this class equipped with a self-contained, closed source of pneumatic pressure designed to react with complete accuracy to signals transmitted thereto.

It is yet another object of this invention to provide an actuator of this class which is employable in remote locations difficult of access where ordinary separate sources of compressed gas, as compressed air supplied by a compressor, may not be available.

It is also a further object of this invention to provide an actuator of this class which may be employed in plants otherwise exclusively equipped with electrical controls, to complement as electrical signal transmitter by making response to signals with detailed accuracy not obtainable by electrical means.

Objects of the invention as pertinent to the part that is new, may be stated hereinunder as additional objects, as follows:

It is a primary and important object of the improved invention to provide an electro-pneumatic actuator of this class in which the self-contained, closed source of pressurized gas, or alternatively, the closed pressurized gas system, is disposed all within a single sealed housing.

It is still another object of the improved invention to provide an electro-pneumatic actuator of the aforesaid single sealed housing type, which includes a pressure regulator between receiver and control chamber to reduce the receiver discharge pressure to a usable value.

It is yet a further object of the improved invention to provide an electro-pneumatic actuator of the aforesaid single sealed housing type, which includes a positioner spring between diaphragm and control valve, to insure correlation between diaphragm shaft movement and control signals, and a seal tube movable with the diaphragm to seal the partition between control chamber and low pressure chamber.

Other and further objects may be apparent when the specification herein is considered in connection with the drawings, in which:

FIG. 1 is a small scale elevational view, partially diagrammatic, showing generally the apparatus cooperative in an embodiment of the invention, the figure disclosing direction of flow in one phase of operation;

FIG. 2 is a small scale view, comparable to the view of FIG. 1, showing direction of flow in the other phase of operation;

FIG. 3 is an enlarged elevational view showing further details of the apparatus shown in FIGS. 1 and 2;

FIG. 4 is an elevational view, partially diagrammatic, showing apparatus adding refinement of control or amplification to output response to transmitted signal;

FIG. 5 is a fragmentary elevational view showing another embodiment of the invention in which a hydraulic cylinder is employed in place of the diaphragm housing and diaphragm;

FIG. 6 is a large scale, sectional elevation, partially diagrammatic, of another, more compactly designed embodiment of an actuator, with improved features and elements of operation; and FIG. 7 is a small scale elevational view of the embodiment shown in FIG. 6 connected in actuating relationship with an external physical condition, as a pipeline.

The part of this application carried over from the co-pending application, and relating to FIGS. 1–5, inclusive, is set forth as follows:

Referring in detail to the drawings in which like reference numerals are applied to like elements in the various views, an actuator system 10 is shown in FIGS. 1 and 2 which is adapted to respond in accurate correspondence with the impulse of a signal transmitted from a control box CB, the response of the actuator being in turn effective upon an external physical condition controlled by the control box CB.

In general the apparatus included by the system comprises a transducer 11 which is electrically connected to the control box CB by insulated electrical conductors 12, 13. The transducer 11 actuates control valve means therein which receives gas of the closed system, as nitrogen, from a high pressure receiver 14 by way of a supply conduit 15 and delivers gas therefrom through an output conduit 16, the valve means also venting the gas through a vent conduit 17 which branches externally of the transducer into a suction conduit 18 and a low pressure delivery conduit 19.

The output conduit 16 connects into an upper diaphragm housing section 20 to communicate with an upper expansible and contractible chamber 21 above a diaphragm 22, the periphery of the diaphragm being constrained between the flange of the aforesaid upper diaphragm housing section 20 and the flange of a lower, or low pressure housing section 23.

The diaphragm 22 has a shaft 24 connected to its underside centrally thereof and this shaft extends sealably through the low pressure housing section 23 and through a guide housing 25 for connection to correctionally or responsively actuate the aforesaid external physical condition responsive to the signals transmitted from the control box CB to the transducer 11. A spring 30 surrounds the shaft 24 and seats upwardly against the diaphragm 22 and downwardly against the low pressure housing section 23.

An electrically driven motor-compressor 26 comprising an electric motor 27 and a compressor 28 is connected to take suction through the suction conduit 18 which branches from the vent conduit 17 and which has a conventional check valve 29 therein yieldably urged seated so as to prevent flow in an upstream direction and disposed adjacent to the compressor 28. On the other hand the low pressure delivery conduit 19 comprising the other branch from the vent conduit 17 connects into the low pressure housing section 23 to communicate with the low pressure chamber 31 enclosed thereby.

The compressor 28 discharges into a discharge conduit 32 having a conventional check valve 33 therein yieldably urged seated so as to prevent flow in an upstream direction and disposed adjacent to the compressor 28. The compressor 28 is shown in FIG. 3 as being of the diaphragm type having a compression spring 34 seated on the bottom of the compressor housing to urge upwardly against the compressor diaphragm 35 in opposition to the downwardly acting pressure exerted by a shaft 36 connected to the upper surface of the diaphragm 35 centrally thereof and which extends through a guide sleeve 37.

An eccentric cam 38 on the shaft 39 of the motor 27 bears on the top of the shaft 36 and once each shaft revolution the cam 38 urges the diaphragm 35 downwardly on delivery stroke. Thus, once every revolution of the motor shaft 39, compressed air is delivered by way of the discharge conduit 32 into the receiver 14.

The low pressure chamber 31 communicates with the interior of the adjacent inner end of a bellows type switch 40 having its outer end connected to communicate with the interior of the receiver 14. The switch 40 carries an electrical contact bar 41 which extends parallel to the path of travel of the switch 40 and is disposed to establish contact with a contactor point 42 in one power conductor 43 from a source of electrical power.

The movable contact bar 41 has a power conductor 43' connected thereto of length having play therein to compensate for contract bar travel, and this conductor 43' extends to one terminal T of the motor 27, whereby the bar 41 comprises the switch closing and openings means in series circuit of one power conductor 43. The other power conductor 44 extends from the opposite motor terminal T' to the source of electrical power.

The transducer 11 includes a magnet 45 therewithin having a core 46 disposed concentrically within the magnet, and a wound coil 47 is disposed between the magnet 45 and the core 46, the conductors 12, 13 from the control box CB being connected at opposite ends to the coil windings.

Thus when the control box CB emits a signal, the coil 47 is energized and moves the upper end of a beam 48 to the left from the position shown in FIG. 3 so that the beam 48 pivots about its fulcrum 49 to move a vent valve element 50 on the lower end of the beam to the right to reduce the opening or close on a vent valve seat 51 provided by a wall 52 across the transducer 11 which divides the transducer housing into a transducer chamber 53 and a pneumatic control chamber 54.

The outer wall 55 of the chamber 54 has an orifice or choke 56 therein which reduces the gas or air supply inlet from the conduit 15 to a restricted cross-sectional area whereby the supply gas or air cannot enter the control chamber 54 faster than such air or gas may pass through the vent valve seat into the transducer chamber 53 and therefrom out the vent port 57 in the transducer housing 11 into the vent conduit 17. It can thus be seen that the degree of opening of the vent valve 50 directly determines whether the output pressure of air or gas leaving the chamber 53 through the output port 58 from the control chamber 54 increases or decreases in the output conduit 16 and in the upper diaphragm housing chamber 21.

In FIG. 3 the diaphragm shaft 24 extends sealably through a bonnet seal 59 provided in the upper part of a global valve 60 and has the globe valve element 61 on the lower end thereof to seat and unseat from the globe valve seat 62 through the globe valve wall 63 across the globe valve 60. The valve 60 as shown is disposed in a conduit 64, as a pipeline 65, and downstream from the valve 60 the control box CB is connected into the conduit 64 to respond to a variable condition, which, for example may be pressure downstream of the valve 60.

*Operation*

In case the pressure downstream in the conduit 64 is lower than a predetermined desired reading, the globe valve 60 should be urged in further opening direction to permit the transported gas to pass downstream at a greater rate to build up downstream pressure. The control box CB thus responds to the pressure acting thereagainst to transmit a signal to the transducer 11 in the form of electrical current flowing to the coil 47. The coil 47, as energized, moves the upper end of the beam 48 to the right as viewed in FIG. 3, thereby opening the vent valve seat 51 by moving the vent valve element 50 away from its seat. This permits a greater proportion of the closed system gas or air to pass through the valve seat 51 and out through the vent port 57 into the vent conduit 17 to pass into the low pressure chamber 31. This reduces the pressure in the upper diaphragm chamber 21 and increases the pressure in the lower chamber 31 and thereby the spring 30 may urge the diaphragm 22 upwardly as the gas or air is vented from the transducer chamber 53.

The reaction of the spring 30 against the diaphragm 22 is a comparatively slow reaction as the spring 30 can move the diaphragm 22 upwardly no faster than the gas in the upper chamber 21 can be forced out of such upper chamber 21 as the air or gas therebelow in the output conduit 16 is forced back into the pneumatic control chamber 54 and out through the valve seat 51 past the valve element 50 on the lower end of the beam 48.

As the vent conduit 19 exhausts into the low pressure chamber 31 the pressure in this chamber rises causing the bellows switch 40 to expand and move the contact bar 41 into circuit closing contact with the contact point 42 to close circuit to the motor 27 thereby to drive the compressor 28 to take suction from the suction line or conduit 18 and to discharge into receiver 14. Consequently pressure builds up in the receiver 14 and now falls or decreases in the low pressure chamber 31 with the consequence that the bellows contracts and carries the contact bar 41 out of contact to open the circuit 43, 43'.

In case the pressure downstream in the conduit 64 is higher than a predetermined desired reading, the globe valve 60 should be urged further in closing direction to restrict the pipeline gas from passing downstream at a slower rate so as to reduce downstream pressure. The control box CB thus responds to the pressure acting thereagainst to transmit a signal to the transducer 11 in the form of electrical current flowing to the coil 47. The coil 47, as energized, moves the upper end of the beam 48 to the left as viewed in FIG. 3 thereby moving the vent valve element 50 in direction to reduce the opening of or close the valve seat 51. A lesser proportion of the closed system gas or air now bleeds off through the valve seat 51 to pass out into the vent line or conduit 17 and into the low pressure chamber 31. Consequently a greater amount of gas or air now passes through the output conduit 16 to build up pressure in the upper chamber 21 whereby the diaphragm 22 is urged downwardly against the upward urging of the spring 30 with the consequence that the shaft 24 urges the valve element 61 downwardly in valve seat closing direction to reduce the opening of said element or to close the valve seat 62.

As this reaction takes place in due time the pressure in the upper chamber 21 builds up to an operative figure, fed by air or gas from the output conduit 16, the pressure drops in the receiver 14 due to the gas or air passing therefrom out the input or supply conduit 15 and into the pneumatic control chamber 54, all or the greatest proportion thereof to pass through the output conduit 16 to the upper chamber 21. Thus the depletion of the gas or air in the receiver 14 causes the bellows 40 to move left in direction of the receiver 14 and the bellows 40 carries with it contact bar 41 as it acts responsive to the pressure overbalance in favor of the chamber 31, and thus circuit making contact is established with the contact point 42 to close the circuit 43, 43' and start the motor-compressor 26 to draw air or gas from the suction conduit 18 to replenish the receiver 14.

In order to amplify the responsiveness or sensitivity of the pneumatic system, the response of gas or air in the output conduit 16 responsive to transmitted signals, an amplifier 66 may be provided and attached to the end of the pneumatic control chamber 54 as indicated in dotted lines in FIG. 3, and as shown in detail in FIG. 4.

The amplifier 66 includes a housing or block 67 having a by-pass 68 from the input conduit 15 connected thereinto to communicate with a passage 69 provided to extend coaxially with said conduit 15 and by-pass 68. Such passage 69 provides a valve seat 70 against which the outer end or valve element 71 of a valve stem 72 may seat inwardly.

The passage 69 also includes a counterbored chamber 73 providing outwardly a seat for a spring 74 which surrounds the valve stem 72 and bears inwardly against a flange 75 rigidly connected to the valve stem 72. The passage 69 also provides a guide bore 76 for the valve stem 72, and an inner chamber 77 with which the chamber 73 communicates as indicated by the port 78. The inner end of the valve stem 72 comprises a valve element 79 which can seat in a valve seat 80 carried by a diaphragm 81 across the inner chamber 77.

An additional diaphragm 82 is provided in the chamber 77 spaced outwardly of the diaphragm 81 which is in turn spaced from the adjacent end of the block 67 by a control chamber 83 comprising the outer end of the chamber 77. A by-pass vent 84 extends from the space between the diaphragms 81 and 82 to the vent conduit 17 outwardly of the transducer housing 11; the control chamber 83 communicates, through a port 85 through the outer wall of the transducer housing 11, with the pneumatic control chamber 54; also the output conduit 16 connects into the block 67 to communicate with the chamber 73.

In operation, when the transducer 11 is signalled, the pneumatic pressure in the pneumatic control chamber is changed in direction indicated by the vent valve movement in accordance with the signal. This changes the pressure in the control chamber 83 as operative against the outer diaphragm 82. The inner diaphragm 81 moves responsively with the outer diaphragm 82 and accordingly moves the valve seat 80 carried thereby with relation to the valve element 79 carried on the end of the valve stem 72. As the travel of the valve stem 72 is limited by contact of the flange 75 carried thereby coming into contact with the guide wall 76, this means that the diaphragm 81 can move the valve seat 80 away from the stem end element 79.

Conversely the diaphragm 81 can move in direction of the stem 72 and seat upon its end element 79, and urge the valve stem 72 outwardly to unseat the valve element 71, allowing supply gas from input by-pass 68 to pass into the chamber 73 and out therefrom into the output conduit 16.

On the other hand, when the valve stem end element 79 is unseated while the valve stem end element 71 is seated, then gas or air can pass from the output conduit 16 through the chamber 73 and port 78 into the inner end of the chamber 77 and through diaphragm valve seat 80 to the vent by-pass conduit 84.

It is noticeable that a more positive reaction occurs under each condition under which the output pressure is required to change, whether the change involves building up, or bleeding down the output pressure. It can thus be seen that an amplifier of this class can enhance the rapidity of reaction in either direction.

Although a diaphragm actuated system is shown in FIGS. 1, 2 and 3, the invention may as well be operated by a cylinder in place of the diaphragm housing sections, and such a cylinder 85' is shown in FIG. 5. In this arrangement a piston 86 serves the closure function of the diaphragm 22, and a piston rod or shaft 87 serves the function of the diaphragm shaft 24. Also a spring 30' comparable to the spring 30 serves to yieldably oppose the pressure of gas or air which enters the upper end of the cylinder to pass into a chamber 21' and urge downwardly on the head of the piston 85. In such arrangement the lower end chamber 31' of the cylinder, below the piston 85, is comparable to the low pressure chamber 31 below the diaphragm. Correspondingly, therefore, the conduit 19 will connect into the chamber 31' and connection for a switch 40 is provided therefrom.

Various features of construction are shown employed. As the receiver 14 is subject to the build up of high pressures therein cooling fins 88 may be provided along the receiver housing. As to arrangement of apparatus, it is of importance that all of the components may be assembled and integrally mounted. As a sample of arrangement the motor-compressor 26 is shown mounted structurally on top of the upper diaphragm housing section 20, while the transducer housing 11 is indicated by dotted lines as being connected to the lower diaphragm housing sections.

The invention is not limited to the combinations shown in FIG. 3, but, as indicated in FIG. 2, the combinations may include any type of control box and any external physical condition to be controlled thereby. For example, the physical conditions may be the position of damper in a boiler stack or furnace, the position of a ship's rudder, the position of a metering pump feed, the engagement and disengagement of clutches, control of engine throttles, or the position of steam turbine governors.

The part of this application pertinent to improved and newly added structure is shown in FIGS. 6 and 7 in which an actuator system 10' is enclosed in a single or unitary sealed housing 110 in manner that only a single element, as the shaft 24', extends from the actuator assembly 10' to respond to the actuator in controlling an external physical condition as for instance, the globe valve 60' in the pipeline 65', shown in FIG. 7.

In this regard the shaft 24' extends through a bonnet seal 59' provided by the globe valve 60' to open and close a valve seat within the globe valve corresponding with the valve seat 62 which is opened or closed by movement of the valve element 61 on the shaft 24 shown in FIG. 3. In such usage the valve shaft 24' shown in FIG. 7 extends from a guide housing 25', the guide housing 25' is in turn connected to a housing support 23' which has the actuator housing 110 mounted thereon; a guide sleeve or spider 112 being provided across the support 23' through which the shaft 24' guidably extends. Also, the support structure 23' is anchored or supported in fixed relation to the pipeline 65; by any conventional support means, not shown.

In the detailed disclosure of FIG. 6, the unitary housing 110 is closed by a diaphragm 22' which has its periphery confined between the flanges of the housing 110 and the support 23'. The shaft 24' which extends into controlling contact with the external physical condition, as the flow in the pipeline 65', has a reduced diameter upper end 24a which passes through a washer 106 that shoulders on the shaft 24' and bears on the underside of the diaphragm 22'; the shaft end 24a extending through the diaphragm 22' and through the closure or base of a cup or seal tube 105, and through a washer 107 which seats upon the seal tube base. The threaded, upper or terminal part of the shaft end 24a has a nut 108 threaded thereon to bear upon the washer 107 whereby the shaft 24' is rigidly connected to the diaphragm 22', and thus must move responsive to diaphragm movement.

Inwardly of the diaphragm 22' a partition or closure plate 113 is provided across the housing 110 to divide the housing into a lower or control chamber 21a, and an upper or low pressure chamber 31'. The aforesaid seal tube 105 extends sealably through a central bore in the partition 113, a O-ring 114 in an annular groove in the central bore of the partition 113 serving to insure sealing between the control chamber 21a and the low pressure chamber 31'.

A nipple or tubular cap 52' is mounted to upstand above the partition plate 113 and provides a pneumatic control chamber 54' which communicates with the control chamber 21a by way of a port 16'; thus the nipple 52' is included by, and forms part of, the partition 113 which divides the housing 110 into the control chamber 21a and the low pressure chamber 31'.

A valve seat 51' is provided in the top of the nipple or chamber 52', and a beam 48' has a valve element 50' formed on the left end thereof, as viewed in FIG. 6, to control the opening and closing of the valve seat 51'. Such beam 48' pivots or teeters upon a fulcrum 49' which upstands from the partition plate 113. The beam 48' has an electrical coil 47' supported from the underside of the right end thereof while a magnet 45' upstands from the partition 113 and extends upwardly around the coil 47' as a magnetic core 46' extends upwardly from the center of the magnet 45' and within the coil 47'. Electrical conductors 12', 13' extend from the opposite ends of the coil 47' and pass out sealably through the housing wall 110 as within a single insulative cord 115 to a control box CB in the conduit 64' of the pipeline 65'. Such control box CB emanates signals responsive to conditions in the pipeline which are electrically transferred to the coil 47' to vary the magnetic field and consequently the degree of movement of the beam 48'.

A positioner spring 38 is shown within the sealed tube 105 based downwardly upon the washer 107 and upwardly against the underside of the beam 48' of the transducer 11', thus to yieldably oppose movement of the beam 48' in either direction as it responds to the actuation of the magnetic assembly which includes the magnet 45'.

A motor-compressor assembly 26' is mounted upon a base 116 within the low pressure chamber 31' of the housing 110 and such assembly includes a compressor 28' lowermost and thereabove the motor 27'. The compressor 28' takes suction through an intake 117 which is controlled by an outwardly seating check valve 29'. The piston 35' of the compressor 28' has its piston rod or shaft 36' extended upwardly guidably through the guide plate 37. A cam 38' mounted on the motor shaft 37' bears upon the upper end of the piston rod 36' and urges it downwardly once each shaft revolution, the compressor piston or plunger 35' being opposed by the upward urging of a spring 34' based upon the support base 116. Thus, each stroke the compressor 28' makes, air or gas is transferred from within the low pressure chamber 31' into the conduit 32' to unseat the inwardly urged check valve 33', and to pass through the conduit 32' into a receiver 14'.

From the receiver 14' the air or gas has outlet into the upstream portion 15a of an outlet conduit 15'. A regulator 90, to be hereinbelow described, is interposed in the outlet conduit 15' between its upstream section 15a and downstream section 15b which terminates in an orifice 56' into the cap or nipple 52'.

A bellows 40' communicates with the interior of the receiver 14' and expands or contracts responsive to the change in pressure differential between the interior of the receiver 14' and the low pressure chamber 31'. A contact bar 41' is rigidly connected to, and extends transversely from the bellows 40' and moves with the bellows movement into and out of contact with a contact point 42' of a power conductor 43b. Such conductor 43b extends to one terminal Ta of the motor 27'.

From the other terminal Tb of the motor 27' a power conductor 44' extends sealably from the motor 27' and the conductors 41', 43a may extend in a single insulator cord, not shown, to a source of electrical power.

The regulator 90, interposed between the conduit sections 15a, 15b of the outlet conduit 15' provides a control chamber 91 into which the upstream section 15a of the outlet conduit connects. A spring 92 has one end based in the chamber 91 to bear inwardly against a valve element 93 which opens and closes a valve seat 94 at the inner end of the chamber 91; a passage 95 connecting the chamber 91 with a discharge chamber 96 provided by a recess in the inner end of the regulator 90. A diaphragm 98, with periphery bound between the inner rim of the regulator 90 and the periphery of a bonnet 97, as by conventional means not shown, provides a cavity in which a spring 100 extends between the inner surface of the diaphragm 98 and a bearing plate 101 on the inner end of an adjustment screw 102 which passes threadably through a boss 103 forming the inner central portion of the bonnet 97.

Thus a handle 104 on the exterior end of the adjustment screw 102 may be turned to change the tension with which the spring 100 bears against the diaphragm 98, thereby changing the response of the diaphragm 98 to outlet conduit pressures. In this manner the pressure in which the air or gas flows through the downstream end 15b of the outlet conduit 15' may be maintained at a predetermined, substantially non-fluctuating, constant value.

The operation of this improved form of the invention is substantially as occurs in the form of the invention shown in FIGS. 1–5, inclusive, but in this form of the invention complicated conduits of the character of the conduits 16, 17, 18 and 19 shown in the early form of the invention are eliminated.

When the control box CB, as shown in FIG. 7, responds to pipeline pressures acting thereagainst, the coil 47' responds to increased energization to move the transducer beam 28' in direction to open the valve seat 51' so that high pressure gas or air passes from the control chamber 21a outwardly into low pressure chamber 31' thereby reducing the pressure in the control chamber 21a so that the spring 111 may urge the diaphragm 22' upwardly against the opposing pressure of the positioner spring 38. An increase of pressure within the low chamber 31' compresses the bellows 40' which moves the contact bar 41' into making contact with the point 42' thereby closing the power circuits to the motor 27' to start the motor thus to drive the compressor 28' to transfer air or gas from the low pressure chamber 31' thereby to restore balance between the control chamber 21a and the low pressure chamber 21' within the single housing 110.

As the compressor draws air or gas from the low pressure chamber 31' and discharges it into the receiver 14' the bellows 40' is expanded to move the contact bar 41' out of contact with the contact point 42', thereby stopping the compressor 28'.

Conversely if the impulses from the control box CB are in direction and of intensity to pivot the transducer beam 48' in direction to close the valve seat 51' in this case the gas or air flowing into the control chamber 54' builds up the pressure in the control chamber 21a and reduces the pressure in the receiver 14'.

This increase of pressure in the control chamber 21a urges the diaphragm 22' downwardly so that the shaft 24' is correspondingly urged downwardly to close the globe valve 60' whereby the character of signal impulses emitted by the control box is changed with the consequence that the right end of the beam 48' is teetered downwardly thus to open the valve seat 61' to start the cycle as aforesaid.

An amplifier constructed correspondingly as the amplifier 66 shown in FIG. 4 may be installed as indicated in FIG. 6 with a connection 66a between a three-way valve, not shown in detail, and the conduit 15b; also a connection 66b is provided between the three-way valve and the interior of the control compartment 21a, and with a vent 66c from the three-way valve into the low pressure 31' and the effective operation will be in correspondence, in direction, and in degree with the action of the amplifier 66 hereinabove described.

The invention is therefore not limited to the structures and combinations hereinabove described, but other and further combinations, structures, and usages are included, as long as such fall within the broad spirit of the invention, and within the broad scope of interpretation claimed for and merited by the appended claims.

What is claimed is:

1. An electro-pneumatic actuator including a closed housing with a diaphragm across an end thereof, an actuator shaft extending from said housing, resilient means based externally of said housing to bear against said diaphragm to yieldably oppose outward movement of said shaft in its exertion of mechanical control on an external physical condition, an electrical transducer within said housing, a controller to transmit a signal to said transducer responsive to the needs of said external physical condition, said transducer including a control valve opening into a low pressure chamber comprised by the part of the housing on the opposite side of said transducer from said diaphragm, said control valve being urged toward opening and closing responsive to signal impulses, a positioner spring based on the inner side of said diaphragm to yieldably urge said control valve in opposition to signal impulse, an input conduit, a fixed orifice therein connected to the upstream end of said control valve, a closure plate to support said transducer and extending across said housing to seal off a control chamber between said transducer and said diaphragm, tubular means movable with said diaphragm and sealably through said closure plate to seal between said low pressure chamber and said control chamber, an outlet port between said control valve and orifice and communicating through said closure plate with said control chamber, said housing mounting within said low pressure chamber: a drive means and a pressure increaser driven thereby and taking suction from within said low pressure chamber, a receiver with an inlet to receive high pressure discharge from said pressure increaser, an outlet means connecting said receiver to said fixed orifice, and a pressure sensitive device operable at a predetermined pressure differential between said low pressure chamber and said receiver to start said drive means to drive said pressure increaser to restore a predetermined pressure differential between said receiver and said low pressure chamber whereby to operate said pressure sensitive device to stop said drive means.

2. An electro-pneumatic actuator including a closed housing with a diaphragm across an end thereof, an actuator shaft extending from said housing, resilient means based externally of said housing to bear against said diaphragm to yieldably oppose outward movement of said shaft in its exertion of mechanical control on an external physical condition, a partition dividing said housing into a low pressure chamber and a control chamber adjacent said diaphragm, said housing carrying within said low pressure chamber; a drive means and a pressure increaser driven thereby and taking suction from within said low pressure chamber, a receiver with an inlet to receive high pressure discharge from said pressure increaser, and an electrical transducer supported by said partition, said actuator including a controller to transmit a signal to said transducer responsive to the needs of said external physical condition, said transducer including a control valve through said partition and urged to opening and closing positions responsive to controller signal impulses, a positioner spring disposed between said diaphragm and said control valve to yieldably oppose signal impulse, an outlet conduit from said receiver to a fixed orifice provided through said partition, tubular means movable with said diaphragm and sealably through said partition, and a pressure sensitive device operable at a predetermined pressure differential between said low pressure chamber and said receiver to start said drive means to drive said pressure increaser to restore a predetermined pressure differential between said receiver and said low pressure chamber whereby to operate said pressure sensitive device to stop said drive means.

3. An electro-pneumatic actuator as claimed in claim 2, which additionally includes an air pressure regulator in said outlet conduit to reduce the pressure in said outlet conduit downstream of said regulator to a reduced, predetermined, substantially non-fluctuating value.

4. An electro-pneumatic actuator as claimed in claim 2, which additionally includes an amplifier including a three-way valve operable responsive to pressure in said control chamber, and a by-pass conduit from said three-way valve to said outlet conduit.

References Cited by the Examiner

UNITED STATES PATENTS

| 1,400,550 | 12/1921 | Hopwood | 137—1 |
| 2,758,704 | 8/1956 | Spurlin. | |
| 2,942,581 | 6/1960 | Gaffney | 60—52 |
| 3,120,103 | 2/1964 | Beard et al. | 60—52 |

EDGAR W. GEOGHEGAN, *Primary Examiner.*